United States Patent
Tu

(10) Patent No.: US 7,510,581 B2
(45) Date of Patent: Mar. 31, 2009

(54) METHOD FOR REMOVING PLASTICIZER DURING MANUFACTURING PROCESS OF POLYMERIC SECONDARY BATTERY AND METHOD FOR MANUFACTURING POLYMERIC SECONDARY BATTERY

(75) Inventor: Yu-Ta Tu, Hsinchu Hsien (TW)

(73) Assignee: Sunyen Co., Ltd., Taipei (TW)

( * ) Notice: Subject to any disclaimer, the term of this patent is extended or adjusted under 35 U.S.C. 154(b) by 821 days.

(21) Appl. No.: 11/036,233

(22) Filed: Jan. 14, 2005

(65) Prior Publication Data
US 2006/0143901 A1    Jul. 6, 2006

(51) Int. Cl.
*H01M 10/04* (2006.01)
(52) U.S. Cl. ..................... 29/623.1; 29/623.5
(58) Field of Classification Search ............... 29/623.1, 29/623.5
See application file for complete search history.

(56) References Cited
U.S. PATENT DOCUMENTS

| | | | | |
|---|---|---|---|---|
| 5,540,741 A | * | 7/1996 | Gozdz et al. ............... | 29/623.5 |
| 6,063,899 A | * | 5/2000 | Johnson et al. ........ | 29/623.1 X |
| 6,143,042 A | * | 11/2000 | Rogers ...................... | 29/623.1 |
| 6,273,921 B1 | * | 8/2001 | Stanford et al. ............ | 29/623.1 |

* cited by examiner

Primary Examiner—Stephen J. Kalafut

(57) ABSTRACT

A method for manufacturing a polymeric secondary battery comprises the steps of: (a) forming a positive electrode, a negative electrode, and a separator membrane each containing plasticizer; (b) combining the positive electrode, the negative electrode, and the separator membrane to form a unitary cell; (c) placing the unitary cell into a chamber; (d) introducing a gaseous solvent into the chamber and contacting the gaseous solvent with the unitary cell so that the platicizer dissolves in the gaseous solvent and is removed from the unitary cell thus, during which the gaseous solvent condenses into liquid; (e) collecting a mixture of the solvent and the plasticizer; (f) distilling the mixture for separating the solvent and the plasticizer, which are recyclable after the separation; and (g) activating the plasticizer-free unitary cell by making it absorb an electrolyte solution.

20 Claims, 3 Drawing Sheets

METHOD FOR REMOVING PLASTICIZER DURING MANUFACTURING PROCESS OF POLYMERIC SECONDARY BATTERY AND METHOD FOR MANUFACTURING POLYMERIC SECONDARY BATTERY

BACKGROUND OF THE INVENTION a) Field of the Invention

The invention relates to a method for manufacturing a polymeric secondary battery and, more particularly, to a method for removing plasticizer during a manufacturing process of a polymeric secondary battery.

b) Description of the Related Art

In recent years, the prevalence of portable electronic devices has lead to an increasing demand for better secondary batteries (rechargeable batteries) to use therein. Secondary batteries commonly used are polymeric secondary batteries, which include two types: one type uses a polymer to form an electrode, and the other uses a polymer to form an electrolyte. Since the latter can prevent problems such as leakage, volatilization, and burning of the traditional electrolyte solution, the industry is actively developing secondary batteries of this type However, traditional solid state polymers have poor conductivity, which causes a deficiency in the electrical characteristic of a second battery that uses solid state polymer to form the electrolyte. A polymeric secondary battery disclosed in U.S. Pat. No. 5,540,741 by Bell Communication Research successfully solves this problem. The disclosed polymeric secondary battery is characterized by using a special polymer material (PVDF-HFP) and plasticizer to make a positive electrode, a negative electrode, and a separator membrane, after which they absorb an electrolyte solution and forms a colloidal polymeric electrolyte having good conductivity.

FIG. 1 is a flow chart of the manufacturing process of the polymeric secondary battery according to the patent. First in step 11, a positive electrode is made of polymer (PVDF-HFP), plasticizer, and activated material. Then in step 12, a negative electrode is made of PVDF-HFP, plasticizer, and activated material. A separator membrane is then made of PVDF-HFP and plasticizer in step 13. In step 14, the positive electrode, the negative electrode, and the separator membrane are heated under pressure to fuse their PVDF-HFP together for forming a unitary cell. Then, in step 15, a liquid solvent is used to extract the plasticizer from the unitary cell. Finally, the unitary cell is activated by absorbing an electrolyte solution in step 16.

In this manufacturing process, the function of the plasticizer is to facilitate the positive electrode, the negative electrode, and the separator membrane to be formed as films and be processed. The presence of the plasticizer loosens the polymer structure, thereby the unitary cell absorbs more liquid electrolyte, especially after the plasticizer has been extracted from the unitary cell. The extraction process disclosed by this patent utilizes a liquid solvent to separate the plasticizer in the unitary cell. However, the concentration of the plasticizer in the liquid solvent rises to saturation as the extraction time increases, and the extraction efficiency declines therewith; the extraction process becomes complicated and time-consuming because the saturated liquid solvent has to be changed with a new solvent. Moreover, the plasticizer commonly used by the industry is dibutyl phthalate (DBP), which is a toxic material, extra cost is incurred for treating the extracted liquid waste containing DBP, and hence the production cost increases.

Thus, a simple and efficient method for removing plasticizer in a unitary cell, in which the liquid waste containing plasticizer does not need extra treatment, will effectively shorten the process time, enhance the production capacity, and lower the production cost.

SUMMARY

In view of the above, an object of the present invention is to provide a manufacturing process of a polymeric secondary battery that is able to effectively remove plasticizer in the unitary cell and separate components of liquid waste generated therefrom so they can be recycled.

The manufacturing process of a polymeric secondary battery according to the invention comprises the following steps: (a) forming a positive electrode, a negative electrode, and a separator membrane each containing plasticizer; (b) combining the positive electrode, the negative electrode, and the separator membrane to form a unitary cell; (c) placing the unitary cell into a chamber; (d) introducing a gaseous solvent into the chamber and contacting the gaseous solvent with the unitary cell so that the platicizer dissolves in the gaseous solvent and is removed from the unitary cell thus, during which the gaseous solvent condenses into liquid; (e) collecting a mixture of the solvent and the plasticizer; (f) distilling the mixture for separating the solvent and the plasticizer, which are recyclable after the separation; and (g) activating the plasticizer-free unitary cell by making it absorb an electrolyte solution.

The manufacturing process of a polymeric secondary battery according to the invention shortens process time, enhances production capacity, and lowers production cost.

DETAILED DESCRIPTION OF THE INVENTION

Figure 1:
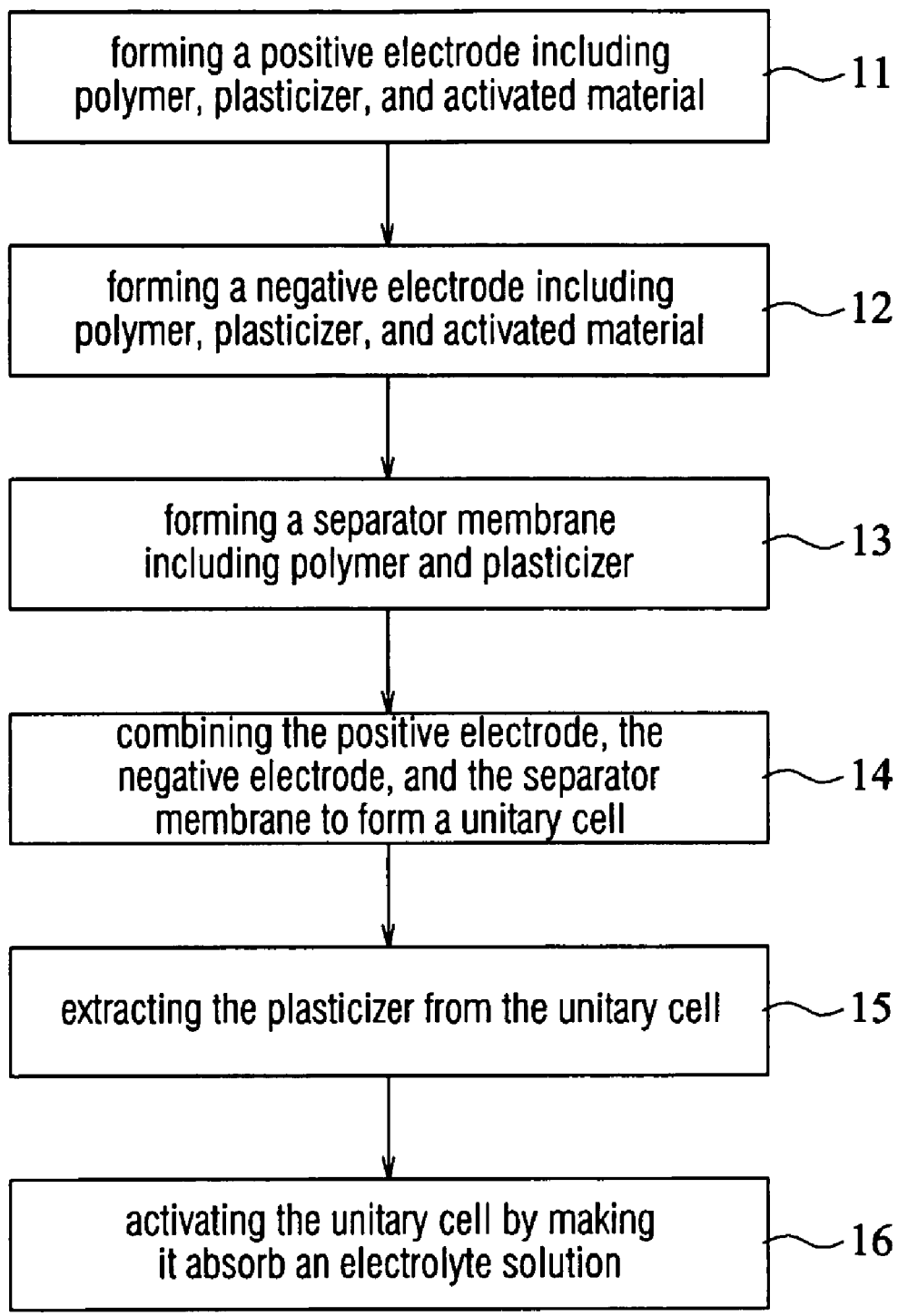
FIG. 1 is a flow chart illustrating a conventional manufacturing process of a polymeric secondary battery.
Figure 2:
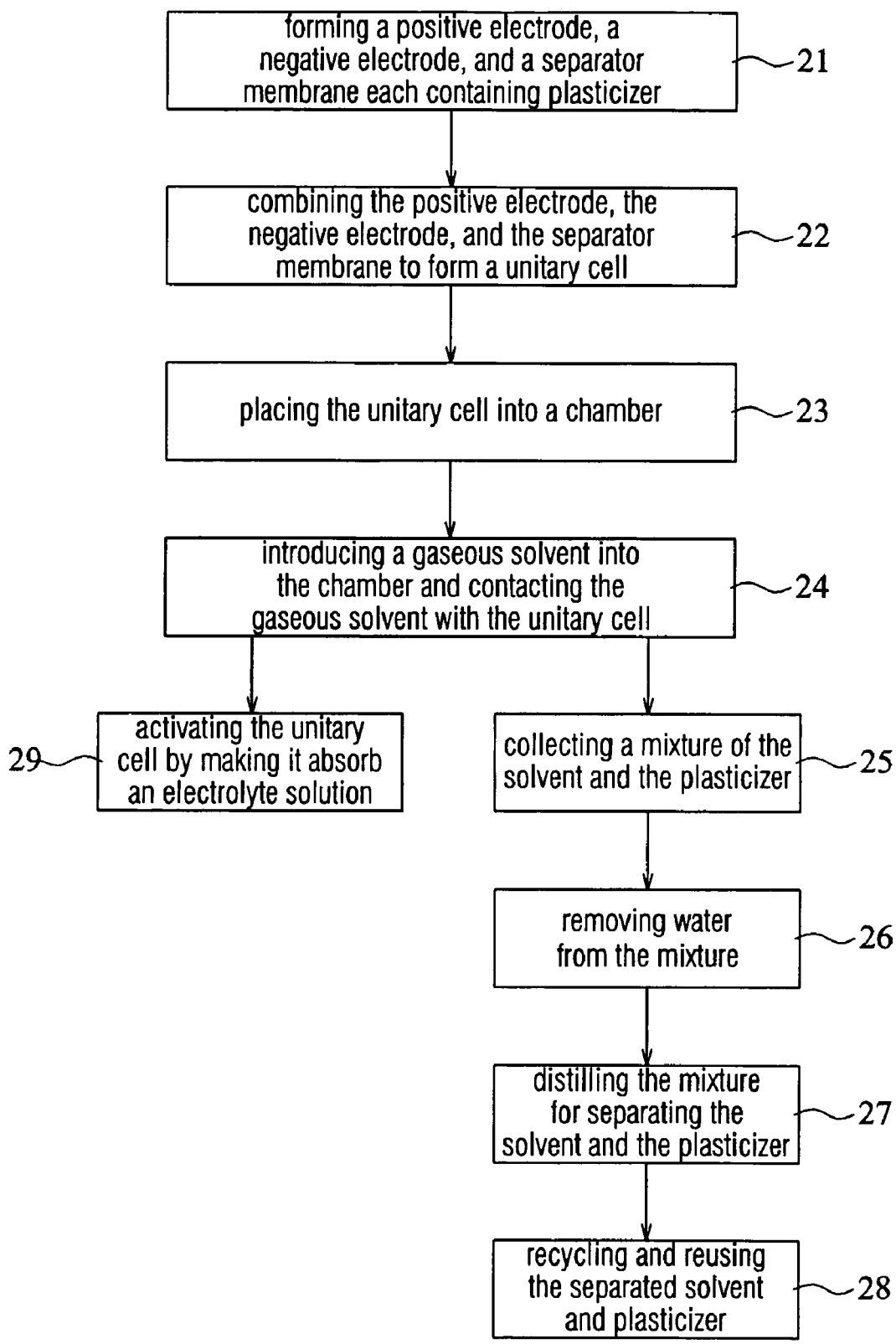
FIG. 2 is a flow chart illustrating a manufacturing process of a polymeric secondary battery according to the invention.

Referring to FIG. 2, a manufacturing process of a polymeric secondary battery according to the invention includes forming a positive electrode, a negative electrode, and a separator membrane all containing plasticizer in step 21, and combining the three to form a unitary cell by heating them under pressure (step 22). These two steps are similar to steps 11-14 of FIG. 1, and will not be described in detail herein. Moreover, in step 21, the plasticizer contained in the positive electrode, the negative electrode, and the separator membrane can be dibutyl phthalate (DBP), dimethyl phthalate (DMP), or diethyl phthalate (DEP), and DBP is preferable.

Figure 3:
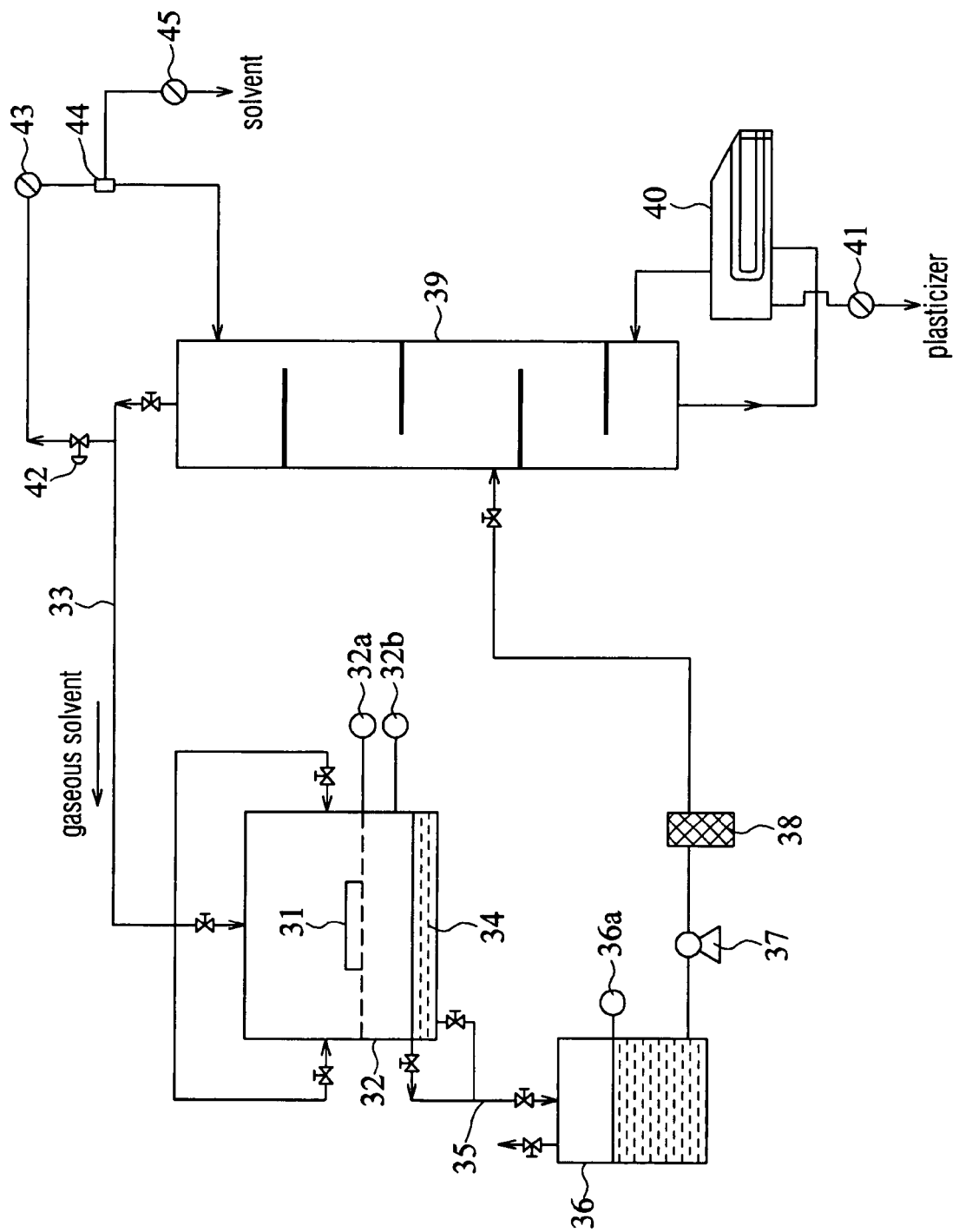
FIG. 3 is a schematic diagram illustrating a system used for removing plasticizer from a unitary battery in the manufacturing process of a polymeric secondary battery according to the invention.

The system illustrated in FIG. 3 is used in steps 23-27 for removing plasticizer from the unitary cell. In step 23, a unitary cell 31 is placed in a chamber 32. In step 24, a gaseous solvent is introduced into the chamber 32 via a conduit 33, and the unitary battery 31 and the gaseous solvent are in contact for a period of time. During this time period, the gaseous solvent dissolves and removes the plasticizer from the unitary cell 31 and condenses into liquid; hence, a mixture 34 of the solvent and the plasticizer gathers on the bottom of the chamber 32.

Referring to FIG. 3, the conduit 33 is connected to the top and sides of the chamber 32 so that the gaseous solvent is fully in contact with the unitary cell 31. In addition, the temperature of the chamber 32 is maintained between 70 and 100° C., and the container exterior should be covered with heat insulating material to prevent heat loss, whereas the vapor pressure of the gaseous solvent in the chamber 32 should be controlled between 1 and 5 kg/cm$^2$. The temperature and pressure of the chamber 32 can be monitored by a pressure gauge 32a and a thermostat 32b. Moreover, the contacting time of the gaseous solvent and the unitary cell 31 should be 30-120 minutes so that the plasticizer can be fully removed from the unitary cell 31 without lowering the production capacity.

In step 25, the mixture 34 of the solvent and the plasticizer is collected to a container 36 via a conduit 35; the container 36 can have a gauge 36a installed therein to detect the liquid level of the mixture 34. When the liquid level reaches a certain height, a pump 37 pumps the mixture 34 into a water-removal filter 38 for removing the water in the mixture 34 (step 26). In this step, the water content of the mixture 34 should be controlled to be less than 0.1%, or if the water content of the mixture 34 is not high, this step may be omitted.

In step 27, the mixture 34 is sent to a distillation tower 39 where it is distilled to separate the plasticizer and the solvent; the plasticizer and the solvent are recycled in step 28 after the separation. Since the boiling point of the solvent is lower than that of the plasticizer, the temperature in the distillation tower 39 is controlled at the boiling point of the solvent so that the concentration of the plasticizer at the bottom of the distillation tower 39 increases. When the concentration of the plasticizer reaches a certain level, the plasticizer is recycled by going through a reboiler 40 and a cooler 41. The recycled plasticizer has a concentration of at least 99% because of the great difference between the boiling points of the solvent and the plasticizer, and thus the recycled plasticizer can be reused as the unitary cell material. On the other hand, a portion of the solvent vapor at the top of the distillation tower 39 can be introduced into the conduit 33 directly for reuse in step 24. The solvent vapor needed is modulated by a pressure controller 42 according to the solvent vapor pressure in the chamber 32, whereas the excess solvent vapor is recycled by going through a condenser 43, a distributor 44, and a cooler 45. In step 29, the plasticizer-free unitary cell 31 fully absorbs an electrolyte solution and is activated thereby; hence the polymeric secondary battery process is completed.

The following factors should be considered when selecting the aforementioned solvent: the plasticizer must dissolve easily in the solvent while the polymer of the unitary cell must not. In the invention, the solvent can be ether, diethyl ether, petroleum ether, hexane, cyclohexane, methanol, ethanol, dichloromethane, trichloroethylene, or trichloroethane, in which methanol is preferable.

EXAMPLE

The aforementioned method and the characteristics of the secondary battery formed using the method is demonstrated by the following example.

The positive electrode is made of active material, conductivity enhancer, polymer material, and plasticizer at a ratio of 75:5:7:13 (by weight) respectively; wherein the active material is LiCoO$_2$, the conductivity enhancer is conductive carbon blacks, the polymer material is polyvinylidene fluoride (PVDF), and the plasticizer is DBP.

The negative electrode is made of active material, conductivity enhancer, polymeric material, and plasticizer at a ratio of 69:3:9:19 (by weight) respectively; wherein the active material is mesocarbon microbeads (MCMB), the conductivity enhancer is conductive carbon blacks, the polymer material is PVDF, and the plasticizer is DBP.

The separator membrane is made of polymer material (PVDF), plasticizer (DBP), and silicon dioxide at a ratio of 25:55:20 (by weight) respectively.

Form a positive electrode, a negative electrode, and a separator membrane according to the formulas stated above, and then cut them into the regular size of cellular phone battery specification 633048 before combining them to form a unitary cell. Place the unitary cell in a chamber where methanol vapor is then introduced therein (the methanol vapor pressure is controlled at 2 kg/cm$^2$). After the unitary cell has been in contact with the methanol vapor for 60-100 minutes, take out the unitary battery, dry it, and place it in an aluminum foil bag for 12 hours and under 85° C., in which the unitary cell is vacuum dried. Insert an electrolyte solution thereinafter to activate the unitary cell.

The polymeric secondary battery made is tested to have an electric capacity of at least 780 mAH, an internal resistance below 70 mΩ, a 0.2 C charging/discharging efficiency of 99.5%, and other properties which all meet the requirements set for utilization in regular cellular phones. Furthermore, the removal rate of DBP is tested to be at least 99.97% by weighing.

In conclusion, through steps 23-27 and the system shown in FIG. 3, the plasticizer can be removed from the unitary cell quickly and effectively. Comparing to the plasticizer extraction method used by the industry (which needs approximately 200 minutes to effectively remove the plasticizer), the invention shortens the manufacturing time of the polymeric secondary battery substantially and enhances the production capacity. Moreover, since the conventional method uses liquid solvent to extract the plasticizer, the concentration of the extracted solution changes continuously until it is saturated, and thus there is a need for monitoring the concentration of the extracted solution or changing it. On the contrary, the invention uses gaseous solvent to separate the plasticizer, and the removing of the plasticizer can be controlled by simply keeping a constant vapor pressure. Therefore, the invention is more operative and controllable than the conventional method. Additionally, the solvent and the plasticizer are effectively recycled according to the invention, which in turn lowers the cost of raw materials substantially.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for removing plasticizer during a manufacturing process of a polymeric secondary battery, the polymeric secondary battery being made from a unitary cell containing plasticizer, the method comprising the steps of:
   (a) placing the unitary cell in a chamber;
   (b) introducing a gaseous solvent into the chamber and contacting the unitary cell with the gaseous solvent so that the plasticizer dissolves in the gaseous solvent and is removed from the unitary cell thus, during which the gaseous solvent condenses into liquid;
   (c) collecting a mixture of the solvent and the plasticizer; and (d) distilling the mixture to separate the solvent and the plasticizer, which are recyclable after the separation.

2. The method as described in claim 1, further comprising a step of removing water from the mixture between step (c) and step (d).

3. The method as described in claim 2, wherein the water removal step decreases the water content of the mixture to below 0.1%.

4. The method as described in claim 1, wherein the temperature of the chamber is maintained at 70-100.degree. C., and the vapor pressure of the solvent is controlled to be in a range of 1-5 kg/cm.sup.2.

5. The method as described in claim 1, wherein the contacting time of the gaseous solvent and the unitary cell is 30-120 minutes.

6. The method as described in claim 1, wherein the solvent has a lower boiling point than that of the plasticizer, and a portion of the solvent vapor separated by distillation is introduced into the chamber for reuse in step (b).

7. The method as described in claim 1, wherein the plasticizer is selected from the group consisting of dibutyl phthalate (DBP), dimethyl phthalate (DMP), and diethyl phthalate (DEP).

8. The method as described in claim 1, wherein the plasticizer is dibutyl phthalate (DBP).

9. The method as described in claim 1, wherein the solvent is selected from the group consisting of ether, diethyl ether, petroleum ether, hexane, cyclohexane, methanol, ethanol, dichloromethane, trichloroethylene, and trichloroethane.

10. The method as described in claim 1, wherein the solvent is methanol.

11. A method for manufacturing a polymeric secondary battery, comprising the steps of:
   (a) forming a positive electrode, a negative electrode, and a separator membrane each containing plasticizer;
   (b) combining the positive electrode, the negative electrode, and the separator membrane to form a unitary cell;
   (c) placing the unitary cell into a chamber;
   (d) introducing a gaseous solvent into the chamber and contacting the gaseous solvenlt with the unitary cell so that the plasticizer dissolves in the gaseous solvent and is removed from the unitary cell thus, during which the gaseous solvent condenses into liquid;
   (e) collecting a mixture of the solvent and the plasticizer;
   (f) distilling the mixture for separating the solvent and the plasticizer, which are recyclable after the separation; and
   (g) activating the plasticizer-free unitary cell by making it absorb an electrolyte solution.

12. The method as described in claim 11, further comprising a step of removing water from the mixture between step (e) and step (f).

13. The method as described in claim 12, wherein the water removal step decreases the water content of the mixture to below 0.1%.

14. The method as described in claim 11, wherein the chamber temperature is maintained at 70-100.degree. C., and the solvent vapor pressure is controlled in a range of 1-5 kg/cm.sup.2.

15. The method as described in claim 11, wherein the contacting time of the gaseous solvent and the unitary cell is 30-120 minutes.

16. The method as described in claim 11, wherein the solvent has a lower boiling point than that of the plasticizer, and a portion of the solvent vapor separated by distillation is introduced into the chamber for reuse in step (d).

17. The method as described in claim 11, wherein the plasticizer is selected from the group consisting of dibutyl phthalate (DBP), dimethyl phthalate (DMP), and diethyl phthalate (DEP).

18. The method as described in claim 11, wherein the plasticizer is dibutyl phthalate (DBP).

19. The method as described in claim 11, wherein the solvent is selected from the group consisting of ether, diethyl ether, petroleum ether, hexane, cyclohexane, methanol, ethanol, dichloromethane, trichloroethylene, and trichloroethane.

20. The method as described in claim 11, wherein the solvent is methanol.

* * * * *